United States Patent [19]

Sottini et al.

[11] Patent Number: 4,521,070
[45] Date of Patent: Jun. 4, 1985

[54] HIGH POWER LASER RADIATION CONVEYING DEVICE UTILIZING VARIABLE SECTION FIBER OPTICS

[75] Inventors: Stefano Sottini, Vaglia; Massimo Brenci, Pistoia; Giancarlo Righini, Florence; Riccardo Falciai, Campi Bixenzio; Vera Russo; Verga A. Scheggi, both of Florence, all of Italy

[73] Assignee: Consiglio Nazionale Delle Ricerche, Rome, Italy

[21] Appl. No.: 361,416

[22] Filed: Mar. 24, 1982

[30] Foreign Application Priority Data

Mar. 24, 1981 [IT] Italy .................. 9367 A/81

[51] Int. Cl.³ ............... G02B 5/14; G02B 7/26
[52] U.S. Cl. ..................... 350/96.15; 350/96.20
[58] Field of Search ............ 350/96.15, 96.18, 96.20, 350/96.21; 250/227

[56] References Cited

U.S. PATENT DOCUMENTS

| 3,779,628 | 12/1973 | Kapron et al. | 350/96.15 |
| 3,843,865 | 10/1974 | Nath | 350/96.34 X |
| 4,212,512 | 7/1980 | Hodge | 350/96.15 |
| 4,398,790 | 8/1983 | Righini et al. | 350/96.18 |
| 4,420,219 | 12/1983 | Muchel | 350/96.18 |

FOREIGN PATENT DOCUMENTS

| 3012775 | 10/1981 | Fed. Rep. of Germany | 350/96.15 |
| 83010 | 6/1980 | Japan | 350/96.15 |
| 1252732 | 11/1971 | United Kingdom | 350/96.15 |
| 1541787 | 3/1979 | United Kingdom | 350/96.15 |

Primary Examiner—William L. Sikes
Assistant Examiner—Frank Gonzalez
Attorney, Agent, or Firm—Kimmel, Crowell & Weaver

[57] ABSTRACT

A device for transferring the energy emitted by a high power laser onto a target characterized in that it comprises two guides of optical fibre having a step index refraction distribution and at least a plastic material coating. The first guide, stiffly coupled to the laser source, is a variable section fibre with an input face of larger diameter. The second guide is a uniform or variable section fibre with a larger diameter near the output terminal. The two guides are joined by a low leakage optical fibre connector, and between them an adapter can be interposed if the output section of the first guide of fibre does not coincide with the input section of the second guide of fibre. The variable section fibre can be drawn from a pre-molded or melted material, with the speed controlled by an electronic circuit. Different kinds of pots can be utilized in order to obtain the fibre plastic coating.

28 Claims, 6 Drawing Figures

HIGH POWER LASER RADIATION CONVEYING DEVICE UTILIZING VARIABLE SECTION FIBER OPTICS

THE INVENTION

The present invention concerns a laser radiation conveying device, utilizing a variable section optical fibre with step index refraction distribution for transferring onto the target the energy emitted by a high power laser source (e.g. Nd-YAG with power 50 W). Such a system has already been the object of the numerous studies and performances both for use in processing of different materials and also for medical purposes, particularly for the cutting and coagulation of tissues.

BACKGROUND OF THE INVENTION

It is known that, for distances of a few meters, the use of a single fibre allows transmission efficiencies of over 80%. Those with step index refraction distribution, e.g. with quartz core and plastic mantle, having a core diameter between 100 and 1000 um seem to be amongst the most suitable fibres.

However, some difficulties can still arise in coupling these fibres to some kinds of source in which the laser beam is liable to some unsteadiness, and therefore to a slight drift regarding the initial direction that allowed the optimal coupling to the fibre. As a consequence, one does not only have a lowering of the efficiency in the coupling itself, but sometimes one also has damage of the mantle of the fibre and of the mechanical supporting parts due to that part of the laser beam that can no longer enter the quartz core.

In U.S. Pat. No. 3,843,865 (G. Nath) the use of a fibre with the variable section core and with an unconventional mantle (air or liquid of appropriate refraction index) is described. Said fibre allows overcoming the aforesaid drawback and, at the same time, to reduce to a minimum the increase of the angular divergence of the output laser beam. It is also possible to obtain a focal spot of recuced sizes by laying a lens at the output of the fibre.

Besides the abovementioned advantages, Nath's fibre also presents some remarkable drawbacks. Firstly, the methods of core manufacturing seem rather complex and expensive, moreover they limit, at least in practice, to 2-3 m the length of the fibre piece which can be performed. As a matter of fact, the thickening of the fibre terminal makes it difficult to wind it onto a drum, besides, the chemical bath method presents some encumberment problems, also. But with most notable drawback of Nath's fibre is the lack of a mantle of traditional type in glass or plastic, in so doing the fibre core turns out to be brittle. The solutions suggested for overcoming the absence of the mantle can most likely present some advantages, e.g. for cooling of the fibre in case of transmitted high powers, but, however, they are complicated and expensive. Furthermore, it seems clear that, at least for powers of 100 W and over, the usual quartz-plastic fibres of large diameter (e.g. 600 um) are enough.

Besides, either owing to changed requirements of use or in case the output terminal turns out to be damaged, one will have to replace the whole device comprising the variable section fibre. The likelihood of a similar drawback is not negligible also in presence of the flow of the protection gas, because of the particles and fumes emitted by the target.

OBJECTIVES OF THE INVENTION

According to the present invention these drawbacks are eliminated by a laser radiation transmission device, in particular of high power, characterized in that it comprises:
- a first guide that can be coupled stiffly to the laser source, of a fibre with variable section quartz core, with mantle still either in quartz or silicon resin, and with external coating in plastic material such as to improve the mechanical features of the fibre itself, having a larger diameter input face optically manufactured and output terminal inserted into the first element of a connector for optical fibres,
- a second guide constituted by a fibre, also with quartz core, mantle still in quartz or silicon resin, and external coating, and with input terminal inserted into the second element of a connector for optical fibres of the same type as the former one.

The profile of the variable section of the first guide of fibre can be advantageously constituted by a portion of cosine curve having a length of at least 50-100 times larger as the greater diameter of the fibre corresponding to the input terminal section.

Still according to the invention, the second guide of fibre, according to use, can be constituted either by a fibre of traditional type having constant diameter, or by a fibre with a variable section core having features analagous to that of the first tract but with the section of larger diameter near the output terminal.

The device according to the invention can also be constituted by two guides of optical fibre as described above, between which an adapting element is interposed, constituted by an optical fibre with quartz core, mantle and external coating, having the input section equal to the output section of the fibre of the first guide with output section equal to the input section of the fibre of the second guide.

Still according to the invention the output termination of the fibre constituting the second guide can be flat, convex, spherical, conical, doped and can be provided with an external focusing system. At any rate said termination can also be provided with a coaxial jet of gas or water for protection and cleanliness.

In order to perform the variable section fibre of the device according to the invention, one can start either from a pre-mould, eventually doped if one wishes a fibre with doped quartz mantle, or from material melted in one or two furnaces (still the case of doped quartz mantle) and to pull the fibre with a speed that can be controlled by an electronic circuit in accordance with the length, the section and the profile of the tapering to be performed, and as soon as said fibre is pulled, one can coat it with a plastic material layer.

Advantageously, one can coat the fibre in plastic material, mantle or only reinforcement, by making it cross inside a pot containing the plastic material in a liquid state and having the output opening variable according to the fibre section, followed by a polymerization furnace.

According to the invention the pot containing the plastic material can be characterized in that the variable section output is made of plastic material which is automatically adaptable to the fibre diameter.

Still according to the invention a different process for coating the fibre with plastic material is characterized by use of a pot with a stiff frame at least equal in height to the variable section guide of the fibre; dismountable into two valves having internally the same profile as the fibre and characterized in that the fibre pulling is stopped when said variable section guide is completely housed inside said pot, in which also polymerisation of the plastic material takes place by electric resistance heating.

When the coating in plastic material constitutes the mantle, it is convenient to add a second coating for protection. The process is completely similar to the former and it is convenient in that it is carried out in cascade to the same.

SUMMARY OF THE INVENTION

The advantages of the present invention consist in the possibility of realizing a high power laser light transmission device having a high efficiency, owing to the variable section fibre, and a great strength and reliability owing to the plastic mantle of the same fibre, that otherwise would turn out to be brittle. Besides, the division of the system into two parts allows that one does not have any restrictions on the length of the variable section fibre guides realized according to the above described process, and that the second guide of fibre can be changed with extreme ease and reliability in order to adapt it to the different requirements of usage or to replace it in case of wear and tear. At the same time the first guide of fibre is located once and for all and forms a unique whole with the laser source, therefore its features (such as length of the variable section guide, diameter of the smallest and largest section) can be chosen so that they adapt themselves to the source itself.

The present invention can be better understood with reference, for a purely exemplifying, to the following drawings.

DESCRIPTION OF THE INVENTION

Figure 1:
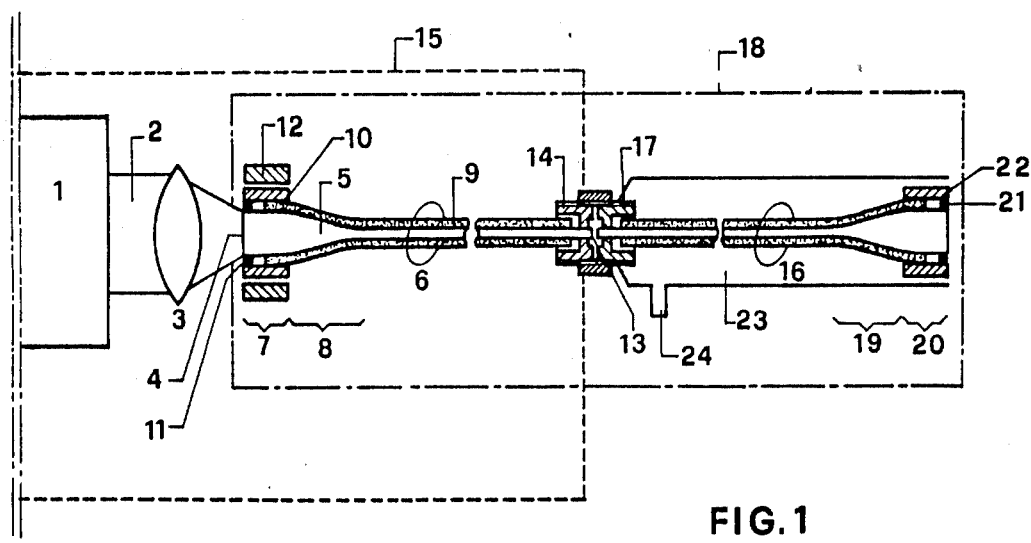
FIG. 1 schematically shows a laser with optical fibre radiation conveying device according to the present invention.

With reference to FIG. 1, the laser 1 emits a beam 2, which, eventually made convergent by the lens 3, arrives at the input face 4 of the core 5 of the guide 6. The face 4 is optically processed with a flat or spherical surface and has a section wide enough (e.g. of diameter 2-4 mm) to ensure at any rate a suitable coupling to the laser source also in the presence of drifts and unsteadiness. The core 5 has a constant input section 7 followed by the variable section 8, preferably cosine curved tapering profile, with a length of at least 50-100 times as large as the greatest diameter of the input of the core.

In such a case the lowering of the acceptance angle with respect to a variable section fibre manufactured in the same materials, only depends on the ratio between the smaller and larger diameters of the fibre in question (e.g. in plastic silica fibre with ratio 0.4 between the two farthest diameters, has an acceptance angle reduced from 15° to 6°).

At the end 8, the diameter of the fibre core is reduced to a value typical of the conventional plastic silica fibres (e.g. 200, 400 or 600 um). The fibre keeps thus constant section up to the output.

The core 5 of the guide 6 is provided with a coating 9 usually comprising two layers, of which the internal, in glass, doped quartz or plastic, constitutes the mantle, and the external, in convenient material, constitutes a protection such as to reduce the fibre brittleness, and, in general, to optimize its mechanical characteristics.

At 7 of the guide 6, above the mantle a metallic gasket 10 is foreseen which, near to the input 4, can be conveniently centred by means of a gauged quartz or ruby ring 11. In such a way, by closing up said metallic gasket by a suitable mechanical system 12, the fibre input can be positioned in a stable and precise way.

The output terminal 13 does not generally require optical processing due to the limited section of the fibre at that point, and can be obtained by cutting with a suitable fibre-cutting machine. The end is then inserted into one of the elements 14 of a suitable connector for optical fibre with very low leakages. Connectors of this kind are well-known in the field of communications. One has obtained leakages 0.5 db (e.g. G. Cocito and others: IEEE Trans on Com 26, 1029-1978) and different types are already on the market. Connectors for fibres of relatively large diameter similar to those used in the present invention can also be found on the market already.

Finally it is to be noted that the whole guide 6 is housed within the casing 15 of the laser source. The manufacturer places it and fixes it in a stable and lasting way.

The second part of the device according to the invention is essentially constituted by a second guide of optical fibre 16 of the same type as the previous (quartz core and plastic, doped quartz or glass mantle).

The input end, that can be obtained by cutting, is inserted into the other element 17 of the above mentioned connector for optical fibre. In such a way the two components of the device 18 can be solidly connected with very low leakages.

According to use, the guide 16 can be constituted either by a constant diameter conventional fibre, or as shown in the figure, by a fibre with variable section core with characteristics similar to those of the first guide but with the section of larger diameter near the output terminal. In this last case the guide 19 with variable section can also be much shorter than section 8 of the first fibre. The output face is of the same order of magnitude as that of the input 4 of the fibre 6 (2-4 mm) and therefore must be optically processed.

In the output, on tract 20, a protection gasket 22 is generally to be foreseen, e.g. metallic, eventually evencentered on the output face with the customary quartz or ruby gauged ring 21. The gasket 22 can also serve for connecting the guide 16 to an eventual handle, to a microscope or to other instruments necessary for use. Lastly, always for protecting guide 16 and, particularly, its output terminal, an external sheath 23 can be added, being able also to convey a suitable gas jet coaxial to the fibre. The gas is foreseen to enter into the sheath-fibre air space across the input 24.

In order to adapt itself to the various uses, the output end of the second guide of fibre can be flat, convex, spherical, conical, doped and can be provided with an external focusing system. Correspondingly, for instance, the output laser beam can be almost collimated or on the contrary focused on a point of very reduced size.

Figure 2:
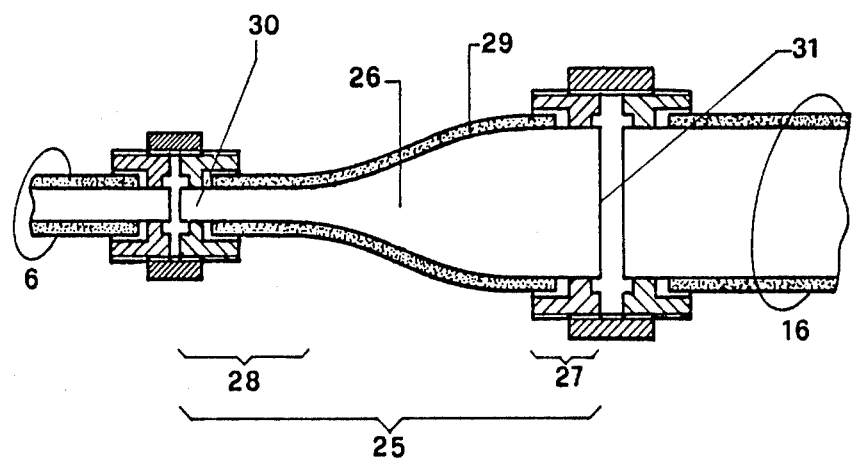
FIG. 2 shows the adapting element interposed between the two guides of fibre contained in the device according to the invention as illustrated in FIG. 1, having the input section equal to the output section of the first fibre guide and the output section equal to the input section of the second fibre guide.

Since the guide 6 of the device 18 is placed once and for all inside the casing 15 containing the laser source, the case is also to be foreseen in which the output section of the guide 6 does not coincide with the input one of the guide 16. In this case, as illustrated in FIG. 2, between the two guides of optical fibre of the device according to the invention, an adapting element 25 is interposed, constituted by a guide of fibre with a variable section quartz core 26 having end terminals 27 and 28 with constant section, respectively equal to the output and input sections of the guides 6 and 16.

The fibre of the adapter 25 has a coating 29 analogous to that of the guides 6 and 16. Lastly, the endings 30 and 31, that can be generally obtained by cutting, are inserted into two elements of connector similar to that already seen in FIG. 1 so that the adapting element 25 can effectively connect with low leakages the elements of guide 6 and 16.

In order to manufacture the variable section fibre of the device according to the invention, one can start either from an eventually doped pre-mould or from material melted in one or two coaxial furnaces and pull the fibre with a speed that can be controlled by an electronic circuit according to the length, the section and profile of the fibre to be manufactured. As soon as said fibre is pulled, it can be coated with a plastic material layer.

Figure 3:
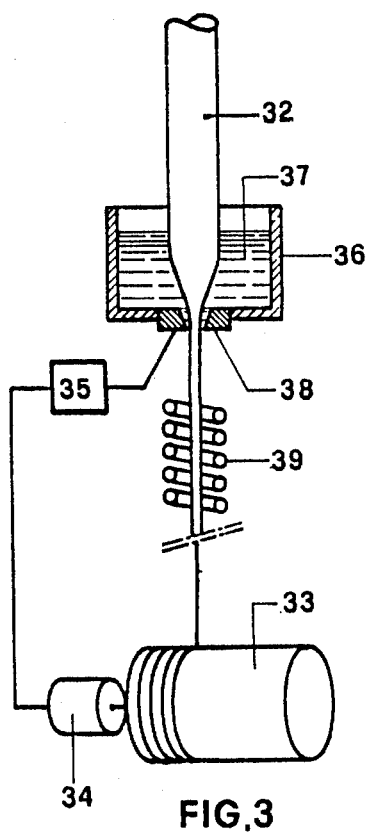
FIG. 3 schematically shows the process for coating with plastic material the variable section fibre.

With reference to FIG. 3, said coating can be made by passing the fibre through the liquid plastic material and by successive polymerisation. The fibre 32 with variable section is pulled by a traction drum 33 driven by a motor 34, the speed of which is adjustable as wished by means of the electronic device 35 in order to have the desired profile of the tapering. Before its winding up on the drum 33, the core of the fibre 32 crosses the pot 36 containing the liquid plastic 37. The fibre, wet by the plastic, runs out through the opening 38, the section of which is variable and is also piloted by the device 35. The fibre has no sooner come out from the opening 38 than it crosses an electrical resistance furnace 39 which brings about the hardening of the plastic.

Figure 4:
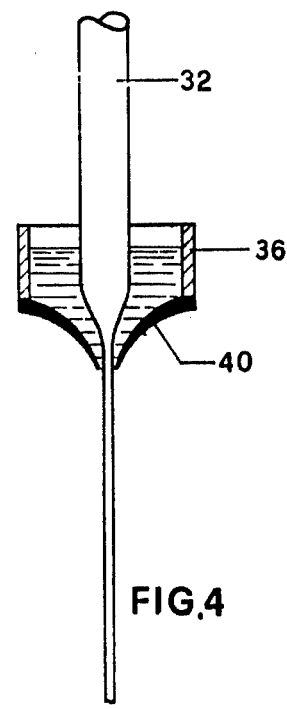
FIG. 4 shows in detail the pot containing the material in a liquid state for the coating of the fibre as illustrated in FIG. 3 and having the output opening in material with high elasticity and automatically adaptable to the fibre diameter.

In a different embodiment, schematically shown in FIG. 4, the pot 36 containing the liquid plastic has the bottom 40 in elastic material and conical shape. In such a way the opening diameter automatically adapts, within certain limits, to the fibre diameter; besides, the conical shape compels the fibre to come out from the pot dragging on itself a sufficient quantity of liquid plastic.

Figure 6:
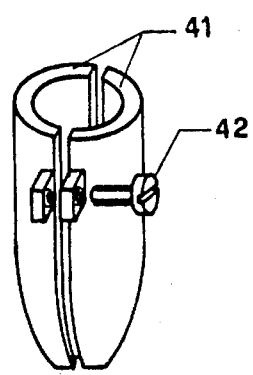
FIG. 6 shows in detail the two valves forming the pot of FIG. 5.
Figure 5:
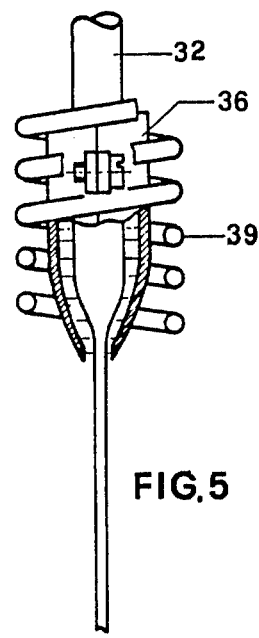
FIG. 5 shows a different embodiment of the pot containing the material for the plastic coating of the fibre as illustrated in FIG. 3, having stiff structure of height at least equal to the tract of the variable section fibre and divided into two valves.

FIG. 5 still shows a different embodiment of the pot 36. The pot has a stiff frame of height at least equal to the guide of the variable section fibre and is constituted by two valves 41 shown in greater detail in FIG. 6, and held together for example by means of screws 42. The fibre 32, sliding inside the pot 36, coating itself with plastic along the constant tract as in the two previous cases, is blocked up (e.g. by means of an electro-optical control) as soon as the entire tapering finds itself dipped into the liquid plastic filling up the pot. The shape of the pot must be such as to constitute practically a casing of the fibre tapering. Afterwards, the pot itself is heated from the outside, by means of the electrical resistance 39, till the hardening of the plastic; at last the two valves 41 are opened and taken away.

What we claim is:

1. A laser radiation conveying device for high power radiation, characterized in that it comprises:
   a connector for optical fibers including an input section and an output section;
   a first guide coupled stiffly to a laser source, made of a varying-diameter section optical fiber core, a mantle and an external coating of plastic material, and including an
   input terminal face, and an output terminal face inserted into said input section of said connector for optical fibers;
   a second guide having an optical fiber core, a mantle and an external plastic coating, and including an input terminal face inserted into said output section of said connector for optical fibers, and an output terminal face; and
   said optical fiber core of said second guide includes a varying-diameter section.

2. A device according to claim 1, characterized in that said cores are made of quartz.

3. A device according to claim 1, characterized in that said mantles are made of quartz.

4. A device according to claim 1, characterized in that said mantles are made of silicon resin.

5. A device according to claim 1 characterized in that the profile of said variable section of said optical fibre core of said first guide includes a portion of cosine curve having a length of at least 50 times as large as the greater diameter of said core corresponding to said input terminal face.

6. A device according to claim 5 characterized in that said optical fibre core of said second guide has a variable diameter.

7. A device according to claim 1 characterized in that said optical fibre core of said second guide has a constant diameter.

8. A device according to claim 1 characterized in that the end of said optical fibre core at said output terminal face of said second guide is flat.

9. A device according to claim 1 characterized in that the end of said optical fibre core at said output terminal face of said second guide is convex.

10. A device according to claim 1 characterized in that the end of said optical fibre core at said output terminal face of said second guide is spherical.

11. A device according to claim 1 characterized in that the end of said optical fibre core at said output terminal face of said second guide is conical.

12. A device according to claim 1 characterized in that the end of said optical fibre core at said output terminal face of said second guide is doped.

13. A laser radiation conveying device for high power radiation comprising;
   a first guide coupled stiffly to the laser source, including a variable section optical fiber core, a cladding and an external coating of plastic material, an input terminal face, and an output terminal face means for providing an input into an input terminal face of a connector for optical fibers;

a second guide, including an optical fiber core, a cladding, an external plastic coating, an input terminal face means for providing an input to said second guide from an output terminal face of said connector for optical fibers, and an output terminal face; and said optical fiber core of said second guide has a variable diameter.

14. A device according to claim 13 wherein said cores are made of quartz.

15. A device according to claim 13 wherein said claddings are made of quartz.

16. A device according to claim 13 wherein said claddings are made of silicon resin.

17. A device according to claim 13 wherein the profile of said variable section of said optical fiber core of said first guide includes a portion of cosine curve having a length of at least 50 times as large as the greater diameter of said core corresponding to said input terminal face.

18. A device according to claim 13 wherein said output terminal portion of said optical fiber core of said second guide has a larger diameter than the remaining part of said optical fiber core.

19. A device according to claim 13 wherein the end of said optical fiber core at said output terminal face of said second guide is flat.

20. A device according to claim 13 wherein the end of said optical fiber core at said output terminal face of said second guide is convex.

21. A device according to claim 13 wherein the end of said optical fiber core at said output terminal face of said second guide is spherical.

22. A device according to claim 13 wherein the end of said optical fiber core at said output terminal face of said second guide is conical.

23. A device according to claim 13 wherein the end of said optical fiber core at said output terminal face of said second guide is doped.

24. A laser radiation conveying device for high power radiation, characterized in that it comprises:

a connector for optical fibers including an input section and an output section;

a first guide coupled stiffly to a laser source, made of a varying-diameter section optical fiber core, a mantle and an external coating of plastic material, and including an input terminal face, and an output terminal face inserted into said input section of said connector for optical fibers;

a second guide having an optical fiber core, a mantle and an external plastic coating, and including an input terminal face inserted into said output section of said connector for optical fibers, and an output terminal face; and said output terminal face of said optical fiber core of said second guide has a larger diameter than the remaining part of said optical fiber core.

25. A laser radiation conveying device for high power radiation, characterized in that it comprises:

a connector for optical fibers including an input section and an output section;

a first guide coupled stiffly to a laser source, made of a varying-diameter section optical fiber core, a mantle and an external coating of plastic material, and including an input terminal face, and an output terminal face inserted into said input section of said connector for optical fibers;

a second guide having an optical fiber core, a mantle and an external plastic coating, and including an input terminal face inserted into said output section of said connector for optical fibers, and an output terminal face; and said connector for optical fibers comprises an optical fiber core, a mantle about said optical fiber core, an external coating about said mantle, an input terminal face of said optical fiber core equal in area to said output terminal face of said first guide optical fiber core, and an output terminal face of said optical fiber core equal in area to said input terminal face of said second guide optical fiber core.

26. A laser radiation conveying device for high power comprising:

a connector for optical fibers including an input section and an output section;

a first guide coupled stiffly to a laser source, made of a varying-diameter section optical fiber core, a mantle and an external coating of plastic material, and including an input terminal face, and an output terminal face inserted into said input section of said connector for optical fibers;

a second guide having an optical fiber core, a mantle and an external plastic coating, and including an input terminal face inserted into said output section of said connector for optical fibers, and an output terminal face;

said profile of said variable section of said optical fiber core of said first guide includes a portion of cosine curve having a length of at least fifty times as large as the greater diameter of said core corresponding to said input terminal face; and said output terminal portion of said optical fiber core of said second guide has a large diameter than the remaining part of said optical fiber core.

27. A laser radiation conveying device for high power radiation, characterized in that it comprises:

a connector for optical fibers including an input section and an output section;

a first guide coupled stiffly to a laser source, made of a varying-diameter section optical fiber core, a mantle and an external coating of plastic material, and including an input terminal face, and an output terminal face inserted into said input section of said connector for optical fibers;

a second guide having an optical fiber core, a mantle and an external plastic coating, and including an input terminal face inserted into said output section of said connector for optical fibers, and an output terminal face;

said profile of said variable section of said optical fiber core of said first guide includes a portion of cosine curve having a length of a least fifty times as large as the greater diameter of said core corresponding to said input terminal face; and an optical fiber core, a mantle about said optical fiber core, an external coating about said mantle, an input terminal face of said optical fiber core equal in area to said output terminal face of said first guide optical fiber core, and an output terminal face of said optical fiber core equal in area to said input terminal face of said second guide optical fiber core.

28. A laser radiation conveying device for high power radiation, comprising:

a connector for optical fibers including an input section and an output section;

a first guide coupled stiffly to a laser source, made of a varying-diameter section optical fiber core, a mantle and an external coating of plastic material, and including an input terminal face, and an output terminal face inserted into said input section of said connector for optical fibers;

a second guide having an optical fiber core, a mantle and an external plastic coating, and including an input terminal face inserted into said output section of said connector for optical fibers, and an output terminal face;

a matching element between said first and said second guide;

said matching element including an optical fiber core of variable diameter, a cladding, a plastic external coating, an input terminal face equal in dimension to said output terminal face of said first guide optical fiber core, an output terminal face equal in dimension to said input terminal face of said second guide optical fiber core; and two of said connectors, one each between said matching element and each of said guides.

* * * * *